United States Patent
Bao et al.

(10) Patent No.: US 10,855,651 B2
(45) Date of Patent: Dec. 1, 2020

(54) METHOD AND DEVICE FOR EFFICIENTLY USING IPV4 PUBLIC ADDRESS

(71) Applicant: Tsinghua University, Beijing (CN)

(72) Inventors: Congxiao Bao, Beijing (CN); Xing Li, Beijing (CN)

(73) Assignee: TSINGHUA UNIVERSITY

( * ) Notice: Subject to any disclaimer, the term of this patent is extended or adjusted under 35 U.S.C. 154(b) by 0 days.

(21) Appl. No.: 16/297,435

(22) Filed: Mar. 8, 2019

(65) Prior Publication Data

US 2019/0281013 A1 Sep. 12, 2019

(30) Foreign Application Priority Data

Mar. 9, 2018 (CN) .......................... 2018 1 0196537

(51) Int. Cl.
*H04L 29/12* (2006.01)

(52) U.S. Cl.
CPC ........ *H04L 61/251* (2013.01); *H04L 61/1511* (2013.01); *H04L 61/2525* (2013.01); *H04L 61/305* (2013.01); *H04L 61/6095* (2013.01)

(58) Field of Classification Search
CPC ............... H04L 61/1511; H04L 61/251; H04L 61/2525; H04L 61/301; H04L 61/6004; H04L 61/6059; H04L 61/6086; H04L 61/6095; H04L 69/16
See application file for complete search history.

(56) References Cited

U.S. PATENT DOCUMENTS

| | | | | |
|---|---|---|---|---|
| 2011/0110374 A1* | 5/2011 | Boucadair | ......... | H04L 29/12358 370/393 |
| 2016/0014071 A1* | 1/2016 | Asati | ................... | H04L 61/6063 709/245 |
| 2018/0191669 A1* | 7/2018 | Barton | .................... | H04L 45/02 |

FOREIGN PATENT DOCUMENTS

| | | |
|---|---|---|
| CN | 101431477 A | 5/2009 |
| CN | 107426156 A | 12/2017 |
| WO | 2013123420 A1 | 8/2013 |

\* cited by examiner

*Primary Examiner* — Gil H. Lee
(74) *Attorney, Agent, or Firm* — Morriss O'Bryant Compagni Cannon, PLLC (57) ABSTRACT

A method and device for efficiently using IPv4 public addresses applied to a core translator deployed between an IPv4 Internet and an IPv6 network, which maps an IPv4 public address into a first-type IPv6 address having a first-type prefix according to a transport layer protocol port range used by an IPv6 server in the IPv6 network, so that the IPv6 server uses the first-type IPv6 address to communicate with a client in the IPv4 Internet; and maps the IPv4 public address into a second-type IPv6 address having a second-type prefix according to a transport layer protocol port range used by an client in the IPv6 network, so that the client in the IPv6 network uses the second-type IPv6 address to communicate with a IPv4 server in the IPv4 Internet. The IPv6 server and the client in the IPv6 network can use the same IPv4 public address to provide different services.

12 Claims, 3 Drawing Sheets

METHOD AND DEVICE FOR EFFICIENTLY USING IPV4 PUBLIC ADDRESS

CROSS-REFERENCE TO RELATED APPLICATIONS

This application claims priority to Chinese Patent Application No. 201810196537.8 filed on Mar. 9, 2018, the entirety of which is incorporated by this reference.

TECHNICAL FIELD

The embodiments of the present application relate to the technical field of computer network communication, and specifically to a method and device for efficiently using IPv4 public address.

BACKGROUND

IPv4 protocol has achieved great success with the rapid development of the Internet over the past 20 years. At present, there are more than 3 billion IPv4 users worldwide, accounting for more than 50% of the total population. However, the rapid growth of the network scale also highlights a series of serious problems of IPv4, including insufficient address space, routing scalability issues and etc. IPv6 protocol is an Internet protocol of the next generation, and used to replace IPv4. IPv6 has characteristics such as huge address space ($2^{128}$), hierarchical addressing and routing mechanisms, better end-to-end features, better security and mobility support.

However, IPv6 is not compatible with IPv4. In order to interconnect a newly-built IPv6 network with the IPv4 Internet, the standards proposed by the IETF include stateless translation scheme IVI, stateful translation scheme NAT64, stateless dual-translation technology MAP-T and stateful dual-translation technology 464xlat etc. It is worth pointing out that any technology that communicates with the IPv4 Internet needs an IPv4 public address. Therefore, IPv4 public addresses are extremely scarce resources in the coexistence phase of IPv4 and IPv6. For a client, it is a mature technology to allocate IPv4 private addresses and reuse IPv4 public addresses with the transport layer ports. But for servers, this technology cannot be used since a server must use IPv4 public addresses and specify specific transport layer ports. Therefore, each IPv4 public address can only have one specific transport layer port (service port) and cannot be reused. The massive use of cloud computing urgently requires IPv4 public addresses of a large number of user servers.

In view of this, how to allow IPv4 public addresses to be available to both servers and clients in the IPv6 network so as to maximize the use of the scarce IPv4 public address resources, has become a technical problem to be solved at present.

SUMMARY

Since the problems above exist in the existing methods, the embodiments of the present application provide a method and device for efficiently using IPv4 public address.

In one aspect, the embodiments of the present application provide a method for efficiently using IPv4 public address, which is applied to a core translator deployed between an IPv4 Internet and an IPv6 network, including:

mapping an IPv4 public address into a first-type IPv6 address having a first-type prefix according to a transport layer protocol port range used by an IPv6 server in the IPv6 network, so that the IPv6 server uses the first-type IPv6 address to communicate with a client in the IPv4 Internet;

mapping the IPv4 public address into a second-type IPv6 address having a second-type prefix according to a transport layer protocol port range used by an client in the IPv6 network, so that the client in the IPv6 network uses the second-type IPv6 address to communicate with a IPv4 server in the IPv4 Internet.

Alternatively, before mapping the IPv4 public address into the first-type IPv6 address having the first-type prefix according to the transport layer protocol port range used by the IPv6 server in the IPv6 network, so that the IPv6 server uses the first-type IPv6 address to communicate with the client in the IPv4 Internet, the method further includes:

configuring translation parameters including the first-type prefix used by the IPv6 server in the IPv6 network, the second-type prefix used by the client in the IPv6 network, a transport layer port range of the IPv6 server, a transport layer port range of the client in the IPv6 network, an IPv4 public address pool, and an IPv4 private address pool with a same size of the IPv4 public address pool; wherein the IPv4 public address pool and the IPv4 private address pool have a one-to-one mapping relation.

Alternatively, the first-type prefix is not overlapped with the second-type prefix.

Alternatively, mapping the IPv4 public address into the first-type IPv6 address having the first-type prefix according to the transport layer protocol port range used by the IPv6 server in the IPv6 network, so that the IPv6 server uses the first-type IPv6 address to communicate with the client in the IPv4 Internet includes:

determining whether a target port of an IPv4 message sent by the client in the IPv4 Internet is within the transport layer port range of the IPv6 server in the IPv6 network, when receiving the IPv4 message sent by the client in the IPv4 Internet;

translating the IPv4 message sent by the client in the IPv4 Internet into an IPv6 message having the first-type prefix and sending the IPv6 message to the IPv6 server, when the target port of the IPv4 message sent by the client in the IPv4 Internet is within the transport layer port range of the IPv6 server in the IPv6 network;

translating the IPv6 message fed back by the IPv6 server into the IPv4 message and sending the IPv4 message to the client in the IPv4 Internet, when receiving the IPv6 message fed back by the IPv6 server.

Alternatively, the IPv4 message sent by the client in the IPv4 Internet is sent based on a record A which is obtained by the client in the IPv4 Internet querying DNS through a domain name server.

Alternatively, mapping the IPv4 public address into the second-type IPv6 address having the second-type prefix according to the transport layer protocol port range used by the client in the IPv6 network, so that the client in the IPv6 network uses the second-type IPv6 address to communicate with the IPv4 server in the IPv4 Internet includes:

translating a received IPv6 message sent by a user-side translator into the IPv4 message and sending the IPv4 message to the IPv4 server in the IPv4 Internet, when receiving the IPv6 message sent by the user-side translator in the IPv6 network; wherein the received IPv6 message sent by the user-side translator is the IPv6 message having the second-type prefix which is translated by the user-side translator with the received IPv4 message sent by the IPv4 client in the IPv6 network;

determining whether a target port of an IPv4 message fed back by the IPv4 server is within a transport layer port range of the IPv6 server in the IPv6 network, when receiving the IPv4 message fed back by the IPv4 server;

translating the IPv4 message fed back by the IPv4 server into the IPv6 message having the second-type prefix and sending the IPv6 message to the user-side translator so that the user-side translator translates the received IPv6 message having the second-type prefix into the IPv4 message and sends the IPv4 message to the IPv4 client in the IPv6 network, when the target port of the IPv4 message fed back by the IPv4 server is not within the transport layer port range of the IPv6 server in the IPv6 network.

Alternatively, after determining whether the target port of the IPv4 message fed back by the IPv4 server is within the transport layer port range of the IPv6 server in the IPv6 network, the method further includes:

translating the IPv4 message fed back by the IPv4 server into the IPv6 message having the first-type prefix and sending the IPv6 message to the IPv6 server, when the target port of the IPv4 message fed back by the IPv4 server is within the transport layer port range of the IPv6 server in the IPv6 network;

translating the IPv6 message fed back by the IPv6 server into the IPv4 message and sending the IPv4 message to the client in the IPv4 Internet, when receiving the IPv6 message fed back by the IPv6 server.

In a second aspect, the embodiments of the present application further provide a device for efficiently using IPv4 public address, which is applied to a core translator deployed between an IPv4 Internet and an IPv6 network, including:

a first mapping module configured to map an IPv4 public address into a first-type IPv6 address having a first-type prefix according to a transport layer protocol port range used by an IPv6 server in the IPv6 network, so that the IPv6 server uses the first-type IPv6 address to communicate with a client in the IPv4 Internet;

a second mapping module configured to map the IPv4 public address into a second-type IPv6 address having a second-type prefix according to a transport layer protocol port range used by an client in the IPv6 network, so that the client in the IPv6 network uses the second-type IPv6 address to communicate with a IPv4 server in the IPv4 Internet.

In a third aspect, the embodiments of the present application further provide an electronic device, including a processor, a memory, a bus and computer programs that are stored in the memory and executable by the processor;

wherein the processor and the memory communicate with each other through the bus;

the processor implements the methods above when executing the computer programs.

In a fourth aspect, the embodiments of the present application provide a non-transitory computer readable storage medium, in which computer programs are stored, wherein the methods above are implemented when the computer programs are executed by a processor.

It can be known from the technical solutions above that, by mapping the IPv4 public address into the first-type IPv6 address having the first-type prefix according to the transport layer protocol port range used by the IPv6 server in the IPv6 network so that the IPv6 server uses the first-type IPv6 address to communicate with a client in an IPv4 Internet, and by mapping the IPv4 public address into the second-type IPv6 address having the second-type prefix according to the transport layer protocol port range used by the client in the IPv6 network so that the client in the IPv6 network uses the second-type IPv6 address to communicate with a IPv4 server in the IPv4 Internet, the embodiments of the present application are able to allow the IPv6 server and the client in the IPv6 network to use the same IPv4 public address to provide different services, and maximize the use of the scarce IPv4 public address resources.

BRIEF DESCRIPTION OF THE DRAWINGS

In order to more clearly describe the embodiments of the present application or the technical solutions in the prior art, the drawings to be used in describing the embodiments or the prior art will be briefly described below. Obviously, the drawings in the following description are only some embodiments of the present application, for those of ordinary skill in the art; other drawings may also be obtained based on these drawings without any creative work.

DETAILED DESCRIPTION

The specific implementation manners of the present application will be further described with reference to the accompanying drawings. The following embodiments are only used to more clearly illustrate the technical solutions of the present application, and cannot be used to limit the scope of the present application.

Figure 1:
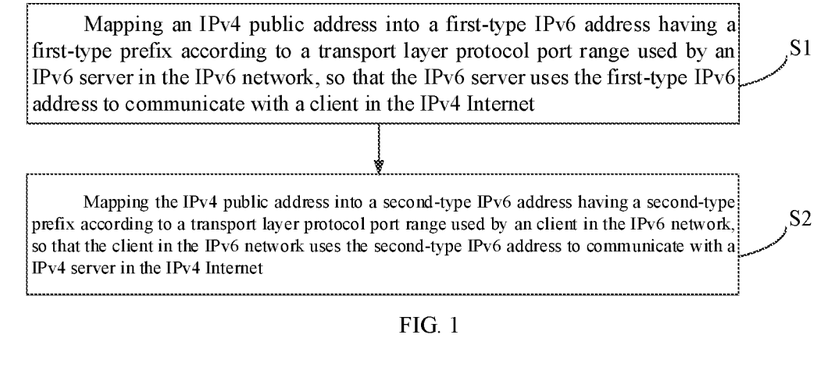
FIG. 1 is a flowchart of the method for efficiently using IPv4 public address according to an embodiment of the present application.

FIG. 1 illustrates a flowchart of the method for efficiently using IPv4 public address according to an embodiment of the present application. The method of the present embodiment is applied to a core translator deployed between an IPv4 Internet and an IPv6 network. As shown in FIG. 1, the method for efficiently using IPv4 public address of the present embodiment includes:

S1, mapping an IPv4 public address into a first-type IPv6 address having a first-type prefix according to a transport layer protocol port range used by an IPv6 server in the IPv6 network, so that the IPv6 server uses the first-type IPv6 address to communicate with a client in the IPv4 Internet.

Wherein, the first-type prefix is not overlapped with a second-type prefix.

S2, mapping the IPv4 public address into a second-type IPv6 address having a second-type prefix according to a transport layer protocol port range used by an client in the IPv6 network, so that the client in the IPv6 network uses the second-type IPv6 address to communicate with a IPv4 server in the IPv4 Internet.

It can be appreciated that by using the dual-translation technology of the reused IPv4 public addresses of the core translator above, the IPv4 client used by a user can communicate with the IPv4 Internet through the pure IPv6 network.

In a specific application, the dual-translation technology in the present embodiment can use a stateless address mapping plus port adjustment technology.

Figure 2:
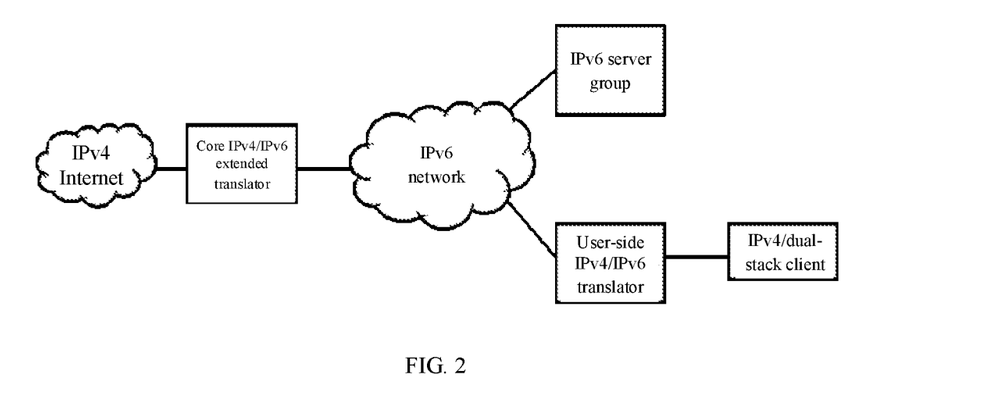
FIG. 2 is a diagram of the network structure implementing the methods of the embodiments of the present application.

It can be appreciated that, FIG. 2 is a diagram of the network structure implementing the method of the present embodiment. A core IPv4/IPv6 extended translator (i.e. the core translator of the present embodiment) is deployed between the IPv4 Internet and the IPv6 network; the IPv6 network is connected to a IPv6 server group and can provide services to the clients (used by the users) in the IPv4 Internet through the core translator; the IPv6 network is connected to the user-side IPv4/IPv6 translator (i.e. the user-side translator in the present embodiment), and is connected to the IPv4/dual-stack client (used by the IPv4/dual-stack user).

By mapping the IPv4 public address into the first-type IPv6 address having the first-type prefix according to the transport layer protocol port range used by the IPv6 server in the IPv6 network so that the IPv6 server uses the first-type IPv6 address to communicate with a client in an IPv4 Internet, and by mapping the IPv4 public address into the second-type IPv6 address having the second-type prefix according to the transport layer protocol port range used by the client in the IPv6 network so that the client in the IPv6 network uses the second-type IPv6 address to communicate with a IPv4 server in the IPv4 Internet, the method for efficiently using IPv4 public address, which is applied to a core translator deployed between the IPV4Internet and the IPV6 network, of the present embodiment is able to allow the IPv6 server and the client in the IPv6 network to use (share) the same IPv4 public address to provide different services, which can complement the needs of network providers and information providers for IPv4 public addresses, and more efficiently maximize the use of the scarce IPv4 public address resources.

In addition, on the basis of the embodiment above, before step S1 above, the method of the present embodiment may further include:

Configuring translation parameters including the first-type prefix used by the IPv6 server in the IPv6 network, the second-type prefix used by the client in the IPv6 network, the transport layer port range of the IPv6 server, the transport layer port range of the client in the IPv6 network, an IPv4 public address pool, and an IPv4 private address pool with a same size of the IPv4 public address pool; wherein the IPv4 public address pool and the IPv4 private address pool have a one-to-one mapping relation.

It can be appreciated that the method of the present embodiment further *needs* to configure 2 IPv6 addresses for each of the IPv6 servers in the IPv6 network, wherein one of the IPv6 addresses mapped according to RFC6052 is calculated with the IPv4 public address pool and the first-type prefix, and the other IPv6 address mapped according to RFC6052 is calculated with the IPv4 private address pool and the first-type prefix; configure an authoritative domain name server mapping of the IPv6 server in the IPv6 network, and configure a record AAAA and a record A for each of the IPv6 servers, wherein the record AAAA is the IPv6 address mapped according to RFC6052 and calculated with the IPv4 public address pool and the first-type prefix, which is configured by the IPv6 serve, and the record A is the IPv4 public address corresponding to the IPv6 server; and configure parameters for translation for the user-side translator, including the second-type prefix and NAT (network address translation) function.

Figure 3:
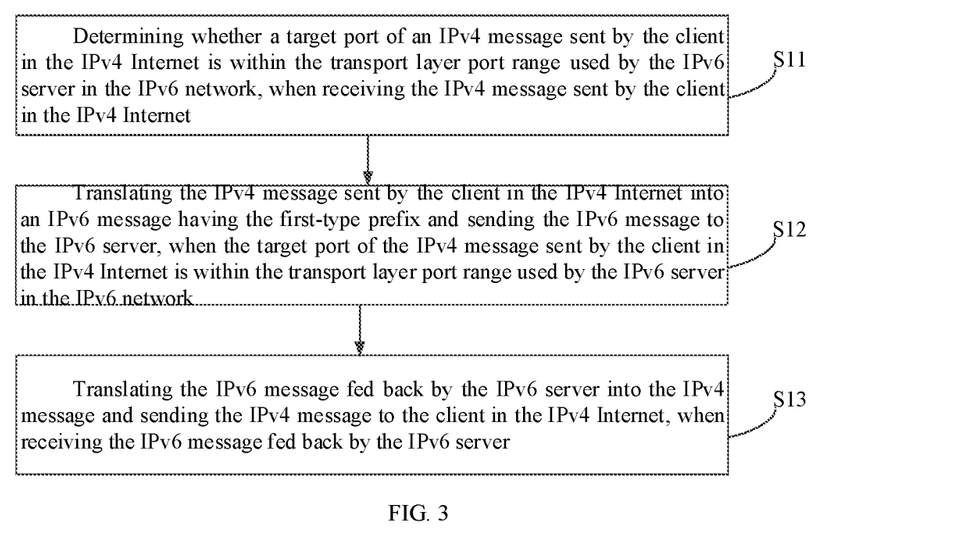
FIG. 3 is a specific flowchart of step S1 according to an embodiment of the application.

In addition, on the basis of the embodiment above, as shown in FIG. 3, step S1 above of the present embodiment may include steps S11-S13:

S11, determining whether a target port of an IPv4 message sent by the client in the IPv4 Internet is within the transport layer port range used by the IPv6 server in the IPv6 network, when receiving the IPv4 message sent by the client in the IPv4 Internet.

S12, translating the IPv4 message sent by the client in the IPv4 Internet into an IPv6 message having the first-type prefix and sending the IPv6 message to the IPv6 server, when the target port of the IPv4 message sent by the client in the IPv4 Internet is within the transport layer port range used by the IPv6 server in the IPv6 network.

In a specific application, the IPv4 message sent by the client in the IPv4 Internet may be translated into the IPv6 message having the first-type prefix according to RFC6052 and RFC7915.

S13, translating the IPv6 message fed back by the IPv6 server into the IPv4 message and sending the IPv4 message to the client in the IPv4 Internet, when receiving the IPv6 message fed back by the IPv6 server.

In a specific application, the IPv6 message fed back by the IPv6 server may be translated into the IPv4 message according to RFC6052 and RFC7915.

Wherein the IPv4 message sent by the client in the IPv4 Internet is sent based on the record A which is obtained by the client in the IPv4 Internet querying DNS through a domain name server.

Therefore, the present embodiment solves the problem that the IPv6 server in the IPv6 network uses the IPv4 public address, which allows the IPv6 server to use the first-type IPv6 address, and the IPv6 server and client in the IPv6 network can share the same IPv4 public address to provide different services, which can complement the needs of network providers and information providers for IPv4 public addresses, and more efficiently maximize the use of the scarce IPv4 public address resources.

Figure 4:
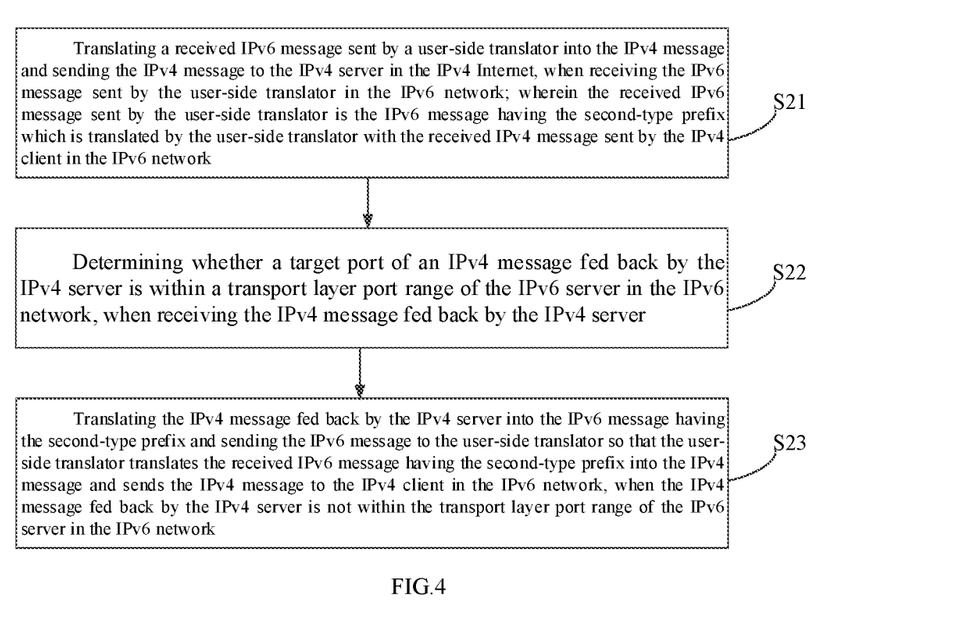
FIG. 4 is a specific flowchart of step S2 according to an embodiment of the application.

In addition, on the basis of the embodiment above, as shown in FIG. 4, step S2 above of the present embodiment may include steps S21-S23:

S21, translating a received IPv6 message sent by a user-side translator into the IPv4 message and sending the IPv4 message to the IPv4 server in the IPv4 Internet, when receiving the IPv6 message sent by the user-side translator in the IPv6 network; wherein the received IPv6 message sent by the user-side translator is the IPv6 message having the second-type prefix which is translated by the user-side translator with the received IPv4 message sent by the IPv4 client in the IPv6 network.

It is to be appreciated that, the received IPv4 message sent by the IPv4 client in the IPv6 network of the user-side translator is sent based on the record A which is obtained by the IPv4 client in the IPv6 network querying DNS through the domain name server, wherein the domain name server directly returns to the record A when it is not the IPv6 server in the IPv6 network on the side that provides services, and the domain name server returns to IPv4 private address record A obtained according to the mapping principle when it is the IPv6 server in the IPv6 network on the side that provides services.

In a specific application, the IPv6 message sent by the user-side translator may be translated into the IPv4 message according to RFC6052 and RFC7915 in this step.

It is to be appreciated that the user-side translator may translate the received IPv4 message into the IPv6 message having the second-type prefix according to NAT rule on the basis of RFC6052 and RFC7915.

S22, determining whether a target port of an IPv4 message fed back by the IPv4 server is within a transport layer port range of the IPv6 server in the IPv6 network, when receiving the IPv4 message fed back by the IPv4 server.

S23, translating the IPv4 message fed back by the IPv4 server into the IPv6 message having the second-type prefix and sending the IPv6 message to the user-side translator so that the user-side translator translates the received IPv6 message having the second-type prefix into the IPv4 message and sends the IPv4 message to the IPv4 client in the IPv6 network, when the IPv4 message fed back by the IPv4 server is not within the transport layer port range of the IPv6 server in the IPv6 network.

In a specific application, the IPv4 message fed back by the IPv4 server may be translated into the IPv6 message having the second-type prefix according to RFC6052 and RFC7915.

It is to be appreciated that, the user-side translator may translate the received IPv6 message having the second-type prefix into the IPv4 message according to RFC6052, RFC7915 and NAT rule.

It is to be appreciated that the IPv4 message fed back by the IPv4 server is translated into the IPv6 message having the first-type prefix which is sent to the IPv6 server, when the IPv4 message fed back by the IPv4 server is within the transport layer port range of the IPv6 server in the IPv6 network; and the IPv6 message fed back by the IPv6 server is translated into the IPv4 message which is sent to the client in the IPv4 Internet when the IPv6 message fed back by the IPv6 server is received.

Specifically, the IPv4 message fed back by the IPv4 server may be translated into the IPv6 message having the first-type prefix according to RFC6052 and RFC7915, and the IPv6 message fed back by the IPv6 server may be translated into the IPv4 message according to RFC6052 and RFC7915.

Therefore, the present embodiment allows the client in the IPv6 network to use the second-type IPv6 address, and the IPv6 server and client in the IPv6 network can share the same IPv4 public address to provide different services, which can complement the needs of network providers and information providers for IPv4 public addresses, and more efficiently maximize the use of the scarce IPv4 public address resources.

The method of the embodiments is further described hereinafter with a specific example.

For example, the first-type prefix of a network is 2001:da8::/32, the second-type prefix is 2001:da9::/32, the transport layer port for the IPv6 server in the IPv6 network is 0-1023 and the transport layer port for the client in the IPv6 network is 1024-65535. The IPv4 public address pool is 1.1.1.0/24, the IPv4 private address pool is 10.0.0.0/24, and the mapping relation is that the last 8 bits are equal. A service port of the transport layer of a WEB server in the home terminal (i.e. the IPv6 network) is 80, the IPv4 public address is 1.1.1.10, the IPv4 private address is 10.0.0.10, and two configured IPv6 addresses are 2001:da8:0101:010a::, 2001:da8:0a00:000a::. The corresponding record AAAA of the authoritative domain name server is 2001:da8:0101:010a::, the record A is 1.1.1.10.

When a client 2.0.0.1 in the IPv4 Internet initiates access to the IPv6 server above, the record A queried is 1.1.1.10, and the transmitted header information of the packet is (X is the port number generated randomly):

TCP, 2.0.0.1# X, 1.1.1.10#80

The core translator detects that the target port number thereof is smaller than 1023 and translates the address with the first-type prefix 2001:da8::/32 according to RFC6052, and the transmitted header information of the packet is:

TCP, [2001:da8:0200:0001::]# X, [2001:da8:0101:010a::]#80

The header information of the packet returned by the IPv6 server is:

TCP, [2001:da8:0101:010a::]#80, [2001:da8:0200:0001::]# X

The transmitted header information of the packet after the core translator is:

TCP, 1.1.1.10#80,2.0.0.1# X

The process is repeated until the communication is finished.

When an IPv4 client 192.168.0.3 in the IPv6 network initiates access to a WEB server of the IPv4 Internet, the record A queried by the domain name resolver is 3.0.0.6. Since it is not within the range of the IPv4 public address shared on the side, it is returned and the transmitted header information of the packet is (Y is the port number generated randomly):

TCP, 192.168.0.3% Y, 3.0.0.6#80

The transmitted header information of the packet after NAT is (Z is the port number after NAT translation):

TCP, 1.1.1.10% Z (Z>1024), 3.0.0.6#80

The address is translated with the second-type prefix 2001:da9::/32 according to RFC6052 after the user-side translator, the transmitted header information of the packet is:

TCP, [2001:da9:0101:010a::]# Z, [2001:da9:0300:0006::]#80

The address is translated according to RFC6052 after the core translator, the transmitted header information of the packet is:

TCP, 1.1.1.10% Z, 3.0.0.6#80

The header information of the packet returned by the IPv4 server in the IPv4 Internet is:

TCP, 3.0.0.6#80, 1.1.1.10% Z

The core translator detects that the target port number thereof is greater than 1023 and translates the address with the second-type prefix 2001:da9::/32 according to RFC6052, and the transmitted header information of the packet is:

TCP, [2001:da9:0300:0006:]#80, [2001:da9:0101:010a::]# Z

The address is translated according to RFC6052 after the user-side translator, the transmitted header information of the packet is:

TCP, 3.0.0.6#80, 1.1.1.10% Z

The transmitted header information of the packet after NAT is:

TCP, 3.0.0.6#80, 192.168.0.3% Y

The process is repeated until the communication is finished.

When an IPv4 client 192.168.0.3 in the IPv6 network initiates access to a WEB server of the IPv6 network, the record A queried by the domain name resolver is 1.1.1.9, it is translated into the corresponding private address 10.0.0.9 as the record A to be provided to the IPv4 client, and the transmitted header information of the packet is (U is the port number generated randomly):

TCP, 192.168.0.3% U, 10.0.0.9#80

The transmitted header information of the packet after NAT is (V is the port number after NAT translation):

TCP, 1.1.1.10% V (V>1024), 10.0.0.9#80

The address is translated with the IPv6 prefix 2001:da9::/32 of the client according to RFC6052 after the user-side translator, the transmitted header information of the packet is:

TCP, [2001:da9:0101:010a::]# V, [2001:da9:0a00:0009:]#80

The address is translated according to RFC6052 after the core translator, the transmitted header information of the packet is:

TCP, 1.1.1.10% V, 10.0.0.9#80

The header information of the packet returned by the IPv4 server is:

TCP, 10.0.0.9#80, 1.1.1.10% V

The address is translated with the second-type prefix 2001:da9::/32 according to RFC6052 after the core translator, the transmitted header information of the packet is:

TCP, [2001:da9:0a00:0009:]#80, [2001:da9:0101:010a::]# V

The address is translated according to RFC6052 after the user-side translator, the transmitted header information of the packet is:

TCP, 10.0.0.9#80, 1.1.1.10% V

The transmitted header information of the packet after NAT is:

TCP, 10.0.0.9#80, 192.168.0.3% U

The process is repeated until the communication is finished.

The method for efficiently using IPv4 public address allows the IPv6 server and the client to use (share) the same IPv4 public address to provide different services, which can complement the needs of network providers and information providers for IPv4 public addresses, and more efficiently maximize the use of the scarce IPv4 public address resources.

Figure 5:
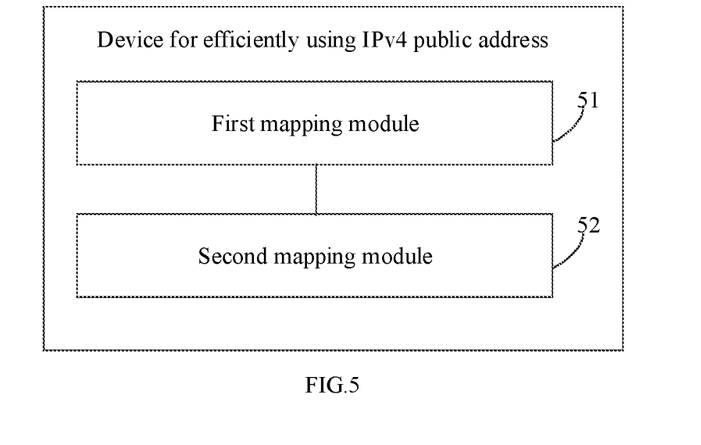
FIG. 5 is a structural diagram of the device for efficiently using IPv4 public address according to an embodiment of the present application.

FIG. 5 illustrates a structural diagram of the device for efficiently using IPv4 public address according to an embodiment of the present application. The device of the present embodiment is applied to a core translator deployed between an IPv4 Internet and an IPv6 network. As shown in FIG. 5, the device for efficiently using IPv4 public address of the present embodiment includes a first mapping module 51 and a second mapping module 52, wherein the first mapping module 51 is configured to map an IPv4 public address into a first-type IPv6 address having a first-type prefix according to a transport layer protocol port range used by an IPv6 server in the IPv6 network, so that the IPv6 server uses the first-type IPv6 address to communicate with a client in the IPv4 Internet;

the second mapping module 52 is configured to map the IPv4 public address into a second-type IPv6 address having a second-type prefix according to a transport layer protocol port range used by an client in the IPv6 network, so that the client in the IPv6 network uses the second-type IPv6 address to communicate with a IPv4 server in the IPv4 Internet.

Specifically, the first mapping module 51 maps the IPv4 public address into the first-type IPv6 address having the first-type prefix according to the transport layer protocol port range used by the IPv6 server in the IPv6 network, so that the IPv6 server uses the first-type IPv6 address to communicate with the client in the IPv4 Internet; the second mapping module 52 maps the IPv4 public address into the second-type IPv6 address having the second-type prefix according to the transport layer protocol port range used by the client in the IPv6 network, so that the client in the IPv6 network uses the second-type IPv6 address to communicate with the IPv4 server in the IPv4 Internet.

Wherein, the first-type prefix is not overlapped with the second-type prefix.

It can be appreciated that by using the dual-translation technology of the reused IPv4 public addresses of the core translator above, the IPv4 client used by a user can communicate with the IPv4 Internet through the pure IPv6 network.

In a specific application, the dual-translation technology in the present embodiment can use a stateless address mapping plus port adjustment technology.

The device for efficiently using IPv4 public address is applied to the core translator deployed between the IPv4 Internet and IPv6 network, and can allow the IPv6 server and the client to use (share) the same IPv4 public address to provide different services, which can complement the needs of network providers and information providers for IPv4 public addresses, and more efficiently maximize the use of the scarce IPv4 public address resources.

In addition, on the basis of the embodiment above, the device of the present embodiment may further include the following modules not shown in the drawings:

a configuring module configured to configure translation parameters including the first-type prefix used by the IPv6 server in the IPv6 network, the second-type prefix used by the client in the IPv6 network, a transport layer port range of the IPv6 server, a transport layer port range of the client in the IPv6 network, an IPv4 public address pool, and an IPv4 private address pool with a same size of the IPv4 public address pool; wherein the IPv4 public address pool and the IPv4 private address pool have a one-to-one mapping relation.

It can be appreciated that it further needs to configure 2 IPv6 addresses for each of the IPv6 servers in the IPv6 network in the present embodiment, wherein one of the IPv6 addresses mapped according to RFC6052 is calculated with the IPv4 public address pool and the first-type prefix, and the other IPv6 address mapped according to RFC6052 is calculated with the IPv4 private address pool and the first-type prefix; configure an authoritative domain name server mapping of the IPv6 server in the IPv6 network, and configure the record AAAA and the record A for each of the IPv6 servers, wherein the record AAAA is the IPv6 address mapped according to RFC6052, calculated with the IPv4 public address pool and the first-type prefix and configured by the IPv6 serve, and the record A is the IPv4 public address corresponding to the IPv6 server; and configure parameters for translation for the user-side translator, including the second-type prefix and NAT (network address translation) function.

In addition, on the basis of the embodiments above, the first mapping module 51 may be specifically configured to determine whether a target port of an IPv4 message sent by the client in the IPv4 Internet is within the transport layer port range of the IPv6 server in the IPv6 network, when receiving the IPv4 message sent by the client in the IPv4 Internet;

translate the IPv4 message sent by the client in the IPv4 Internet into an IPv6 message having the first-type prefix and send the IPv6 message to the IPv6 server, when the target port of the IPv4 message sent by the client in the IPv4 Internet is within the transport layer port range of the IPv6 server in the IPv6 network;

translate the IPv6 message fed back by the IPv6 server into the IPv4 message and send the IPv4 message to the client in the IPv4 Internet, when receiving the IPv6 message fed back by the IPv6 server.

Wherein the IPv4 message sent by the client in the IPv4 Internet is sent based on the record A which is obtained by the client in the IPv4 Internet querying DNS through a domain name server.

Therefore, the present embodiment solves the problem that the IPv6 server in the IPv6 network uses the IPv4 public address, allows the IPv6 server to use the first-type IPv6 address, and the IPv6 server and client in the IPv6 network can share the same IPv4 public address to provide different services, which can complement the needs of network providers and information providers for IPv4 public addresses, and more efficiently maximize the use of the scarce IPv4 public address resources.

In addition, on the basis of the embodiments above, the first mapping module 52 may be specifically configured to translate a received IPv6 message sent by a user-side translator into the IPv4 message and send the IPv4 message to the IPv4 server in the IPv4 Internet, when receiving the IPv6 message sent by the user-side translator in the IPv6 network; wherein the received IPv6 message sent by the user-side translator is the IPv6 message having the second-type prefix which is translated by the user-side translator with the received IPv4 message sent by the IPv4 client in the IPv6 network;

determine whether a target port of an IPv4 message fed back by the IPv4 server is within a transport layer port range of the IPv6 server in the IPv6 network, when receiving the IPv4 message fed back by the IPv4 server;

translate the IPv4 message fed back by the IPv4 server into the IPv6 message having the second-type prefix and send the IPv6 message to the user-side translator so that the user-side translator translates the received IPv6 message having the second-type prefix into the IPv4 message and send the IPv4 message to the IPv4 client in the IPv6 network, when the target port of the IPv4 message fed back by the IPv4 server is not within the transport layer port range of the IPv6 server in the IPv6 network.

Wherein the received IPv4 message sent by the IPv4 client in the IPv6 network of the user-side translator is sent based on the record A which is obtained by the IPv4 client in the IPv6 network querying DNS through the domain name server, wherein the domain name server directly returns to the record A when it is not the IPv6 server in the IPv6 network on the side that provides services, and the domain name server returns to IPv4 private address record A obtained according to the mapping principle when it is the IPv6 server in the IPv6 network on the side that provides services.

In addition, the first mapping module 52 may be further specifically configured to translate the IPv4 message fed back by the IPv4 server into the IPv6 message having the first-type prefix which is sent to the IPv6 server, when the IPv4 message fed back by the IPv4 server is within the transport layer port range of the IPv6 server in the IPv6 network; and translate the IPv6 message fed back by the IPv6 server into the IPv4 message which is sent to the client in the IPv4 Internet when receiving the IPv6 message fed back by the IPv6 server.

Therefore, the present embodiment allows the client in the IPv6 network to use the first-type IPv6 address, and the IPv6 server and client in the IPv6 network can share the same IPv4 public address to provide different services, which can complement the needs of network providers and information providers for IPv4 public addresses, and more efficiently maximize the use of the scarce IPv4 public address resources.

The device for efficiently using IPv4 public address of the present embodiment can execute the technical solutions of the method embodiments above. The implementation principle and technical effects of them are similar, and will not be repeated herein.

Figure 6:
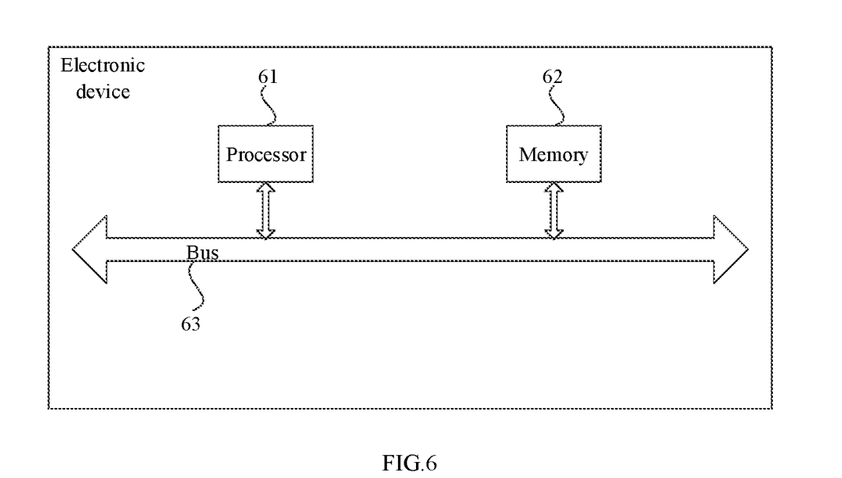
FIG. 6 is a physical structural diagram of the electronic device according to an embodiment of the present application.

FIG. 6 illustrates a physical structure of an electronic device provided by an embodiment of the present application. As shown in FIG. 6, the electronic device may include:

a processor 61, a memory 62, a bus 63 and computer programs that are stored in the memory 62 and executable by the processor 61;

wherein the processor 61 and the memory 62 communicate with each other through the bus 63;

the processor 61 implements the methods of the method embodiments above when executes the computer programs. The methods, for example, may include mapping the IPv4 public address into the first-type IPv6 address having the first-type prefix according to the transport layer protocol port range used by the IPv6 server in the IPv6 network, so that the IPv6 server uses the first-type IPv6 address to communicate with the client in the IPv4 Internet; mapping the IPv4 public address into the second-type IPv6 address having the second-type prefix according to the transport layer protocol port range used by the client in the IPv6 network, so that the client in the IPv6 network uses the second-type IPv6 address to communicate with the IPv4 server in the IPv4 Internet.

The embodiments of the present application provide a non-transitory computer readable storage medium, in which computer programs are stored, wherein the methods of the method embodiments above are implemented when the computer programs are executed by a processor. The methods, for example, may include mapping the IPv4 public address into the first-type IPv6 address having the first-type prefix according to the transport layer protocol port range used by the IPv6 server in the IPv6 network, so that the IPv6 server uses the first-type IPv6 address to communicate with the client in the IPv4 Internet; mapping the IPv4 public address into the second-type IPv6 address having the second-type prefix according to the transport layer protocol port range used by the client in the IPv6 network, so that the client in the IPv6 network uses the second-type IPv6 address to communicate with the IPv4 server in the IPv4 Internet.

The person skilled in the art should appreciate that the embodiments of the present application can be provided as a method, a device, or a computer program product. Therefore, the present application can be implemented in the form of an entire-hardware embodiment, an entire-software embodiment, or an embodiment in combination of software and hardware. Moreover, the application can be implemented in the form of a computer program product that can be implemented in one or more computer applicable storage mediums (including but not limited to disk storage, CD-ROM, optical storage, etc.) including computer applicable program codes.

The present application is described with reference to the flowcharts and/or block diagrams of the methods, devices and computer program products according to the embodiments of the present application. It is to be appreciated that the flowchart and/or each process in the block diagram and/or blocks, and the combinations of the flowchart and/or the process in the block diagram and/or blocks can be implemented with computer program instructions. These computer program instructions can be provided to a processor of a general-purpose computer, a special-purpose computer, an embedded computer, or other programmable data processing device to produce a machine, so that the instructions executed by the processor of the computer or other programmable data processing device generate a device/system for achieving the functions designated in one or more processes in the flowchart(s) and/or one or more blocks in the block diagram(s).

These computer program instructions can also be stored in a computer readable memory that can guide a computer or other programmable data processing device to operate in a particular manner, so that the instructions stored in the computer readable memory produce a manufacture including an instruction device implementing the functions designated in one or more processes in the flowchart(s) and/or one or more blocks in the block diagram(s).

These computer program instructions can also be loaded onto a computer or other programmable data processing devices, so that a series of operational steps is performed on the computer or other programmable devices to generate the processing implemented by computer, so that the instructions executed on the computer or other programmable devices provide steps for achieving the functions designated in one or more processes in the flowchart(s) and/or one or more blocks in the block diagram(s).

It is to be noted that, in this context, relational terms such as the first type and the second type are used merely to distinguish one entity or operation from another entity or operation, and do not necessarily require or imply that such actual relationship or order exists between these entities or operations. Furthermore, the terms "include", "comprise" or any other variations thereof are intended to encompass a non-exclusive inclusion, such that a process, method, article, or device including a plurality of elements includes not only those elements but also other elements that are not explicitly listed, or elements that are inherent to such process, method, item, or device. An element that is defined by term "including/comprising a . . ." does not exclude the presence of additional equivalent elements in the process, method, item, or device that includes the element. The orientation or position relations indicated by the terms "upper", "lower", etc. are based on the orientation or position relations shown in the drawings, which are merely for the convenience of describing the present application and simplifying the description, and do not indicate or imply that the device or component referred to must have the specific orientation, be constructed and operated in the specific orientation. Therefore it cannot be construed as limiting the present application. Unless specifically defined or limited, the terms "mount", "connect to", and "connect with" should be understood in a broad sense, for example, they may be fixed connections or may be removable connections, or integrated connections; may be mechanical connections or electrical connections; they may also be direct connections or indirect connections through intermediate medium, or may be internal communication of two components. For a person of ordinary skill in the art, the specific meanings of the terms above in the present application can be understood according to specific situations.

In the description of the present application, numerous specific details are set forth. However, it is to be appreciated that the embodiments of the present application may be practiced without these specific details. In some instances, well-known methods, structures and techniques are not shown in detail so as not to obscure the understanding of the description. Similarly, it is to be appreciated that, in order to simplify the disclosure of the present application and facilitate the understanding of one or more of the various invention aspects, various features of the application are sometimes grouped together into a single embodiment, diagram or the description thereof in the description of the exemplary embodiments of the present application. However, the disclosed methods should not be construed as reflecting the intention that the present application sought to be protected requires more features than those specifically recited in each of the claims. Or rather, as reflected in the claims, the inventive aspects lie in being less than all features of the single embodiment disclosed above. Therefore, the claims following the embodiments are hereby explicitly incorporated into the embodiments, and each of the claims is a separate embodiment of the present application. It is to be noted that the embodiments of the present application and the features in the embodiments may be combined with each other without conflict. The present application is not limited to any single aspect, or to any single embodiment, or to any combination and/or substitution of these aspects and/or embodiments. Moreover, each aspect and/or embodiment of the present application may be used alone or in combination with one or more other aspects and/or other embodiments thereof.

Finally, it is to be noted that each embodiment above is only used to illustrate rather than limit the technical solutions of the present application; although the present application has been described in detail with reference to the foregoing embodiments, those of ordinary skill in the art should appreciate that they can still modify the technical solutions described in the foregoing embodiments, or equivalently replace some or all of the technical features therein; and these modifications or replacements do not separate the essence of the corresponding technical solutions from the spirit and scope of the technical solutions of each of the embodiments of the present application, all of which should fall within the scope of the claims and description of the present application.

The invention claimed is:

1. A method for efficiently using IPv4 public address, which is applied to a core translator deployed between an IPv4 Internet and an IPv6 network, comprising:

mapping an IPv4 public address into a first-type IPv6 address having a first-type prefix according to a transport layer protocol port range used by an IPv6 server in the IPv6 network, so that the IPv6 server uses the first-type IPv6 address to communicate with a client in the IPv4 Internet; and mapping the IPv4 public address into a second-type IPv6 address having a second-type prefix according to a transport layer protocol port range used by a client in the IPv6 network, so that the client in the IPv6 network uses the second-type IPv6 address to communicate with a IPv4 server in the IPv4 Internet;

wherein mapping the IPv4 public address into the first-type IPv6 address having the first-type prefix according to the transport layer protocol port range used by the IPv6 server in the IPv6 network, so that the IPv6 server uses the first-type IPv6 address to communicate with the client in the IPv4 Internet comprises:

determining whether a target port of an IPv4 message sent by the client in the IPv4 Internet is within the transport layer port range of the IPv6 server in the IPv6 network, when receiving the IPv4 message sent by the client in the IPv4 Internet;

translating the IPv4 message sent by the client in the IPv4 Internet into an IPv6 message having the first-type prefix and sending the IPv6 message to the IPv6 server, when the target port of the IPv4 message sent by the client in the IPv4 Internet is within the transport layer port range of the IPv6 server in the IPv6 network; and translating the IPv6 message fed back by the IPv6 server into the IPv4 message and sending the IPv4 message to the client in the IPv4 Internet, when receiving the IPv6 message fed back by the IPv6 server.

2. The method of claim 1, wherein before mapping the IPv4 public address into the first-type IPv6 address having the first-type prefix according to the transport layer protocol port range used by the IPv6 server in the IPv6 network, so that the IPv6 server uses the first-type IPv6 address to communicate with the client in the IPv4 Internet, the method further comprises:

configuring translation parameters comprising the first-type prefix used by the IPv6 server in the IPv6 network, the second-type prefix used by the client in the IPv6 network, a transport layer port range of the IPv6 server, a transport layer port range of the client in the IPv6 network, an IPv4 public address pool, and an IPv4 private address pool with a same size of the IPv4 public address pool, wherein the IPv4 public address pool and the IPv4 private address pool have a one-to-one mapping relation.

3. The method of claim 1, wherein the first-type prefix and the second-type prefix are not overlapped.

4. The method of claim 1, wherein the IPv4 message sent by the client in the IPv4 Internet is sent based on a record A which is obtained by the client in the IPv4 Internet querying DNS through a domain name server.

5. The method of claim 1, wherein mapping the IPv4 public address into the second-type IPv6 address having the second-type prefix according to the transport layer protocol port range used by the client in the IPv6 network, so that the client in the IPv6 network uses the second-type IPv6 address to communicate with the IPv4 server in the IPv4 Internet comprises:

translating a received IPv6 message sent by a user-side translator into the IPv4 message and sending the IPv4 message to the IPv4 server in the IPv4 Internet, when receiving the IPv6 message sent by the user-side translator in the IPv6 network, wherein the received IPv6 message sent by the user-side translator is the IPv6 message having the second-type prefix which is translated by the user-side translator with the received IPv4 message sent by the IPv4 client in the IPv6 network;

determining whether a target port of an IPv4 message fed back by the IPv4 server is within a transport layer port range of the IPv6 server in the IPv6 network, when receiving the IPv4 message fed back by the IPv4 server;

translating the IPv4 message fed back by the IPv4 server into the IPv6 message having the second-type prefix and sending the IPv6 message to the user-side translator so that the user-side translator translates the received IPv6 message having the second-type prefix into the IPv4 message and sends the IPv4 message to the IPv4 client in the IPv6 network, when the target port of the IPv4 message fed back by the IPv4 server is not within the transport layer port range of the IPv6 server in the IPv6 network.

6. The method of claim 5, wherein after determining whether the target port of the IPv4 message fed back by the IPv4 server is within the transport layer port range of the IPv6 server in the IPv6 network, the method further comprises:

translating the IPv4 message fed back by the IPv4 server into the IPv6 message having the first-type prefix and sending the IPv6 message to the IPv6 server, when the target port of the IPv4 message fed back by the IPv4 server is within the transport layer port range of the IPv6 server in the IPv6 network; and translating the IPv6 message fed back by the IPv6 server into the IPv4 message and sending the IPv4 message to the client in the IPv4 Internet, when receiving the IPv6 message fed back by the IPv6 server.

7. A method for efficiently using IPv4 public address, which is applied to a core translator deployed between an IPv4 Internet and an IPv6 network, comprising:

mapping an IPv4 public address into a first-type IPv6 address having a first-type prefix according to a transport layer protocol port range used by an IPv6 server in the IPv6 network, so that the IPv6 server uses the first-type IPv6 address to communicate with a client in the IPv4 Internet; and mapping the IPv4 public address into a second-type IPv6 address having a second-type prefix according to a transport layer protocol port range used by a client in the IPv6 network, so that the client in the IPv6 network uses the second-type IPv6 address to communicate with a IPv4 server in the IPv4 Internet;

wherein mapping the IPv4 public address into the second-type IPv6 address having the second-type prefix according to the transport layer protocol port range used by the client in the IPv6 network, so that the client in the IPv6 network uses the second-type IPv6 address to communicate with the IPv4 server in the IPv4 Internet comprises:

translating a received IPv6 message sent by a user-side translator into the IPv4 message and sending the IPv4 message to the IPv4 server in the IPv4 Internet, when receiving the IPv6 message sent by the user-side translator in the IPv6 network, wherein the received IPv6 message sent by the user-side translator is the IPv6 message having the second-type prefix which is translated by the user-side translator with the received IPv4 message sent by the IPv4 client in the IPv6 network;

determining whether a target port of an IPv4 message fed back by the IPv4 server is within a transport layer port range of the IPv6 server in the IPv6 network, when receiving the IPv4 message fed back by the IPv4 server; and translating the IPv4 message fed back by the IPv4 server into the IPv6 message having the second-type prefix and sending the IPv6 message to the user-side translator so that the user-side translator translates the received IPv6 message having the second-type prefix into the IPv4 message and sends the IPv4 message to the IPv4 client in the IPv6 network, when the target port of the IPv4 message fed back by the IPv4 server is not within the transport layer port range of the IPv6 server in the IPv6 network.

8. The method of claim 7, wherein before mapping the IPv4 public address into the first-type IPv6 address having the first-type prefix according to the transport layer protocol port range used by the IPv6 server in the IPv6 network, so that the IPv6 server uses the first-type IPv6 address to communicate with the client in the IPv4 Internet, the method further comprises:

configuring translation parameters comprising the first-type prefix used by the IPv6 server in the IPv6 network, the second-type prefix used by the client in the IPv6 network, a transport layer port range of the IPv6 server, a transport layer port range of the client in the IPv6 network, an IPv4 public address pool, and an IPv4 private address pool with a same size of the IPv4 public address pool, wherein the IPv4 public address pool and the IPv4 private address pool have a one-to-one mapping relation.

9. The method of claim 7, wherein the first-type prefix and the second-type prefix are not overlapped.

10. The method of claim 7 wherein mapping the IPv4 public address into the first-type IPv6 address having the first-type prefix according to the transport layer protocol port range used by the IPv6 server in the IPv6 network, so that the IPv6 server uses the first-type IPv6 address to communicate with the client in the IPv4 Internet comprises:
   determining whether a target port of an IPv4 message sent by the client in the IPv4 Internet is within the transport layer port range of the IPv6 server in the IPv6 network, when receiving the IPv4 message sent by the client in the IPv4 Internet;
   translating the IPv4 message sent by the client in the IPv4 Internet into an IPv6 message having the first-type prefix and sending the IPv6 message to the IPv6 server, when the target port of the IPv4 message sent by the client in the IPv4 Internet is within the transport layer port range of the IPv6 server in the IPv6 network; and
   translating the IPv6 message fed back by the IPv6 server into the IPv4 message and sending the IPv4 message to the client in the IPv4 Internet, when receiving the IPv6 message fed back by the IPv6 server.

11. The method of claim 7, wherein the IPv4 message sent by the client in the IPv4 Internet is sent based on a record A which is obtained by the client in the IPv4 Internet querying DNS through a domain name server.

12. The method of claim 11, wherein after determining whether the target port of the IPv4 message fed back by the IPv4 server is within the transport layer port range of the IPv6 server in the IPv6 network, the method further comprises:
   translating the IPv4 message fed back by the IPv4 server into the IPv6 message having the first-type prefix and sending the IPv6 message to the IPv6 server, when the target port of the IPv4 message fed back by the IPv4 server is within the transport layer port range of the IPv6 server in the IPv6 network;
   translating the IPv6 message fed back by the IPv6 server into the IPv4 message and sending the IPv4 message to the client in the IPv4 Internet, when receiving the IPv6 message fed back by the IPv6 server.

* * * * *